United States Patent [19]

Nattel

[11] Patent Number: 5,243,134
[45] Date of Patent: Sep. 7, 1993

[54] COMBINATION POWER AND COMMUNICATION ELECTRICAL WALL TERMINAL

[75] Inventor: William Nattel, Montreal, Canada

[73] Assignee: Westinghouse Electric Corp., Pittsburgh, Pa.

[21] Appl. No.: 705,213

[22] Filed: May 24, 1991

[30] Foreign Application Priority Data

May 25, 1990 [CA] Canada ............................. 2017589

[51] Int. Cl.[5] ............................................. H02G 3/08
[52] U.S. Cl. .................................... 174/53; 174/48; 220/3.92
[58] Field of Search .................... 174/48, 53, 58, 66; 220/3.2, 3.3, 3.4, 3.9, 3.92, 3.94, 241; 439/536

[56] References Cited

U.S. PATENT DOCUMENTS

| | | | |
|---|---|---|---|
| 1,857,787 | 5/1932 | Meeks et al. | 220/3.92 X |
| 3,260,400 | 7/1966 | Miles | 174/48 X |
| 4,451,108 | 5/1984 | Skidmore | 439/536 |
| 4,470,656 | 9/1984 | Moser et al. | |
| 4,494,815 | 1/1985 | Brzostek et al. | 439/536 |
| 4,627,684 | 12/1986 | D'Amato. | |
| 5,114,365 | 5/1992 | Thompson et al. | 174/66 X |

Primary Examiner—Leo P. Picard
Assistant Examiner—David A. Tone
Attorney, Agent, or Firm—G. R. Jarosik

[57] ABSTRACT

A combination electrical wall terminal incorporating a communication receptacle and an electric power device such as a convenience power receptacle, a line switch or the like. The electrical wall terminal comprises a junction box for installation in a hollow wall structure, the junction box defining a housing for the electric power device and includes a pair of laterally projecting and vertically spaced apart support flanges mounted to a side wall of the housing. In addition, the electrical wall terminal comprises a wall plate retained to the support flanges, provided with an aperture facing the junction box housing to receive the power device and includes a communication receptacle that fits between the support flanges of the junction box. The invention also extends to a side plate to adapt a conventional knockdown electrical junction box for use in a combination electrical wall terminal according to the invention.

29 Claims, 3 Drawing Sheets

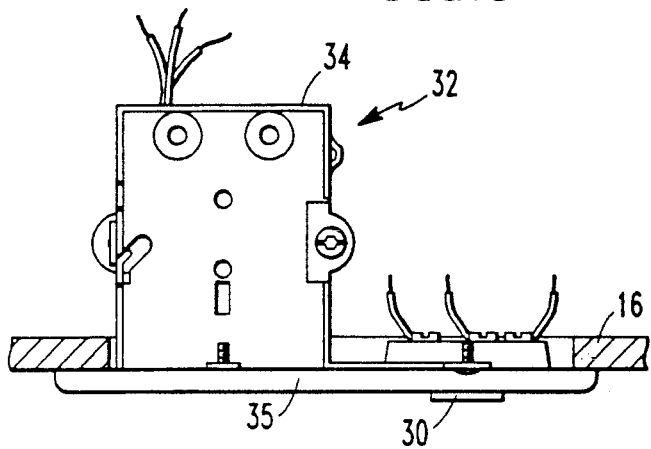
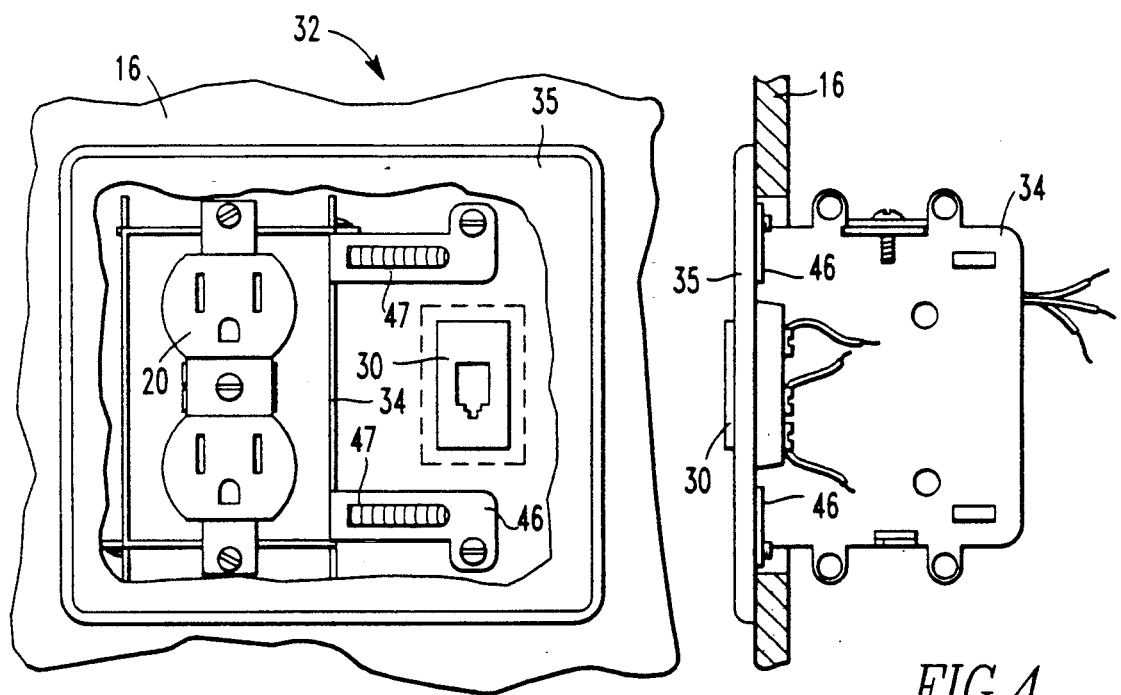

COMBINATION POWER AND COMMUNICATION ELECTRICAL WALL TERMINAL

FIELD OF THE INVENTION

The invention relates to the general field of electrical equipment such as junction boxes and more particularly to a combination electrical wall terminal with a communication receptacle and an electric power device such as a convenience receptacle, a line switch or the like. The invention also extends to an electrical junction box for mounting in a hollow wall structure designed to support the electric power device and the communication receptacle and to provide a physical separation between the respective power and communication conductors. The invention also comprehends a combination wall plate for use with the electrical junction box. Yet, the invention extends to a side plate for adapting a conventional knockdown power electrical junction box for use in a combination electrical wall terminal, according to the invention.

BACKGROUND OF THE INVENTION

As a result of the rapid evolution of communication equipment such as facsimile machines, micro-computers, telephone recording machines, etc., the number of communication receptacles that are now normally required into a dwelling or an office facility have greatly increased during the past years.

In a typical installation, the communication connection for the equipment is provided by attaching to a stud of a hollow wall structure a conventional electrical junction box which serves as a support to a wall plate carrying the communication receptacle that receives the terminal line plug of the equipment. For convenience, the communication outlet is often located close to a power receptacle.

Since, generally, the electrical junction boxes for the communication and the power receptacles are mounted on stud members of the hollow wall structure, the communication and the power wall terminals will be spaced from one another by a minimal distance corresponding to the spacing between two adjacent stud members which typically are set at 16 or 24 inches apart. It would be highly desirable to integrate the communication and the power wall terminals so that the communication and the power cables that come out of the equipment may be grouped into a unitary bundle which is connected to a single location on the wall so as to create, visually speaking, a more pleasant installation.

Although presently available double electrical junction boxes may be employed to house the power receptacle and to support the wall plate carrying the communication receptacle, thus combining the two wall terminals, such an installation is contrary to electrical code regulations which do not allow communication and power conductors in the same conduit or enclosure without a physical barrier between them.

With presently available hardware, locating the power and the communication wall terminals adjacent to one another can only be accomplished by mounting one of the junction boxes on a stud and the other on the wall-board adjacent the stud mounted junction box. For a wall-board mounting, a relatively expensive junction box must be used which employs special clamps allowing to fasten the box to the wall-board. The cost of such an installation is fairly high and for this reason it is not very popular.

OBJECT AND STATEMENT OF THE INVENTION

A principal object of the invention is to provide a combination power and communication wall terminal with the necessary physical barrier between the communication receptacle and the electric power device, be it a convenience power receptacle, a line switch or the like, which is relatively inexpensive to produce and simple to install.

In one aspect, the invention provides a combination power and communication electrical wall terminal for installation into a hollow wall structure of the type including a plurality of spaced apart stud members forming a skeleton frame and supporting a generally planar wall-board, the combination power and communication electrical wall terminal comprising:

a) a junction box defining a housing opened toward the wall-board;

b) a electric power device such as a power receptacle, a switch or the like, mounted in the housing;

c) support flange means mounted to a side wall of the housing and extending laterally therefrom along the wall-board, the support flange means defining an opening; and d) a wall plate mounted to the support flange means, the wall plate including a communication receptacle received in the opening and comprising an aperture engaging the electric power device received into the housing, the side wall of the housing carrying the support flange means constituting a partition between the communication receptacle and the electric power device.

In another aspect, the invention provides an electrical junction box for installation into a hollow wall structure of the type including a plurality of spaced apart stud members forming a skeleton frame supporting a generally planar wall-board, the electrical junction box comprising:

a) a plurality of wall portions defining a housing opened toward the wall-board for receiving an electric power device such as a power receptacle, a switch or the like;

b) support flange means mounted to a side wall of the housing and extending laterally therefrom along the wall-board, the support flange means defining an opening; and c) fastener engaging means on the support flange means to receive a fastener for use in mounting a wall plate incorporating a communication receptacle to the support flanges, which is received in the opening defined by the support flange means and is separated from the electric power device by the side wall of the housing.

In a further aspect, the invention provides a side plate for forming the side of a knockdown electrical junction box, the side plate comprising:

a) a generally rectangular main body including a front edge;

b) means for releasably retaining the main body to a knockdown electrical junction box to complete a housing for receiving an electric power device such as a power receptacle, a switch or the like;

c) support flange means mounted to the main body and projecting laterally therefrom, the support flange means extending adjacent the front edge of the main body generally at a right angle to the main body and defining an opening; and d) fastener engaging means on the support flange means to receive a fastener for use in mounting a wall plate incorporating a communication receptacle to the support flange means, which is received in the opening defined by the support flange means and is separated from an electric power device in the housing by the main body.

The invention also extends to a combination wall plate for attachement to an electrical junction box of the type including a housing for receiving an electric power device such as a power receptacle, a switch or the like, and a support flange means laterally projecting from the housing, the combination wall plate including:

a) a generally planar integrally formed main body;
b) an aperture on the main body;
c) a communication receptacle mounted to the main body, when the combination wall plate is mounted to the electrical junction box, the communication receptacle is received in the support flange means of the electrical junction box and the aperture engages the electric power device in the housing.

The invention also comprehends, in combination:

a) an electrical junction box for installation into a hollow wall structure of the type including a plurality of spaced apart stud members forming a skeleton frame supporting a generally planar wall-board, the electrical junction box including a housing opened toward the wall-board for receiving an electric power device such as a power receptacle, a switch or the like, and a support flange means mounted to a side wall of the housing and extending laterally therefrom along the wall-board, the support flange means defining a seat; and b) a wall plate mounted to the electrical junction box, the wall plate including a generally planar integrally formed main body retained to the support flange means, an aperture on the main body facing the housing for engaging an electric power device to be mounted therein, and a communication receptacle received in the seat defined by the support flange means, the side-wall of the housing which carries the support flange means constituting a partition between the communication receptacle and an electric power device to be mounted in the housing.

BRIEF DESCRIPTION OF THE DRAWINGS

FIG. 3 is a top view of the wall terminal shown in FIG. 2;

FIG. 4 is a side elevational view of the wall terminal shown in FIG. 2;

FIG. 5 is a front elevational view of the wall terminal illustrated in FIG. 2, the wall plate being partly cut away;

Throughout the drawings, the same reference numerals will be used to designate similar components.

DESCRIPTION OF A PREFERRED EMBODIMENT

Figure 1:
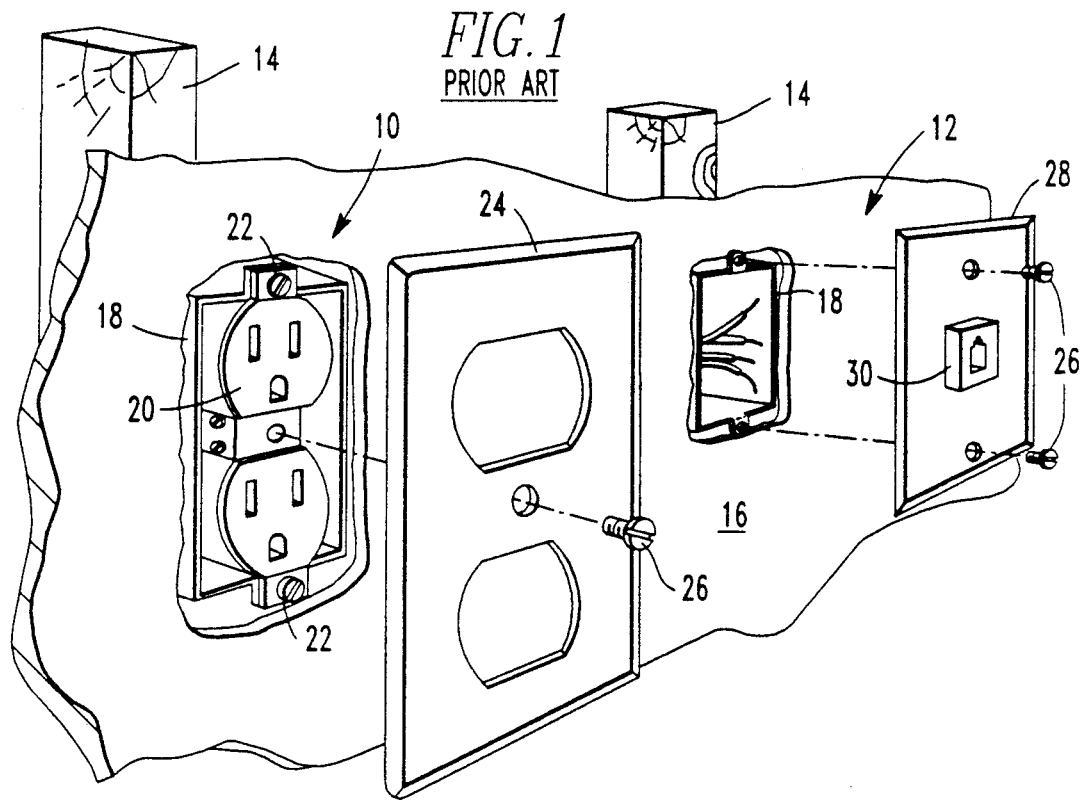
FIG. 1 is a perspective view of a communication and power wall terminal installation according to a prior art technique.

FIG. 1 is an exploded perspective view of a power wall terminal and a communication wall terminal installed in a conventional manner. The terminals, identified generally by the reference numerals 10 and 12, are mounted into a hollow wall structure including a skeleton frame formed by a plurality of spaced apart stud members 14 which are covered by a planar wall-board 16. The power wall terminal 10 includes a metallic electrical junction box 18 secured to one of the studs 14 and houses a conventional dual power receptacle 20 secured to the box 18 by means of screws 22. A wall plate 24 is provided with two vertically spaced apart apertures for receiving the bosses of the receptacle 20 and is mounted to the latter by means of a central screw 26.

The communication wall terminal 12 presents some similitudes with the power terminal 10 in that it also uses a metallic electrical junction box 18 which serves to hold a wall plate 28 incorporating a communication receptacle 30. The wall plate 28 is secured to the junction box 18 by means of screws 26.

The drawback of this prior art installation resides in that the power and communication wall terminals are separated from one another as a result of mounting the junction box 18 of each terminal to a different stud member. As it has been mentioned earlier in this disclosure, it is highly desirable to group the two terminals into a single unit.

Figure 2:
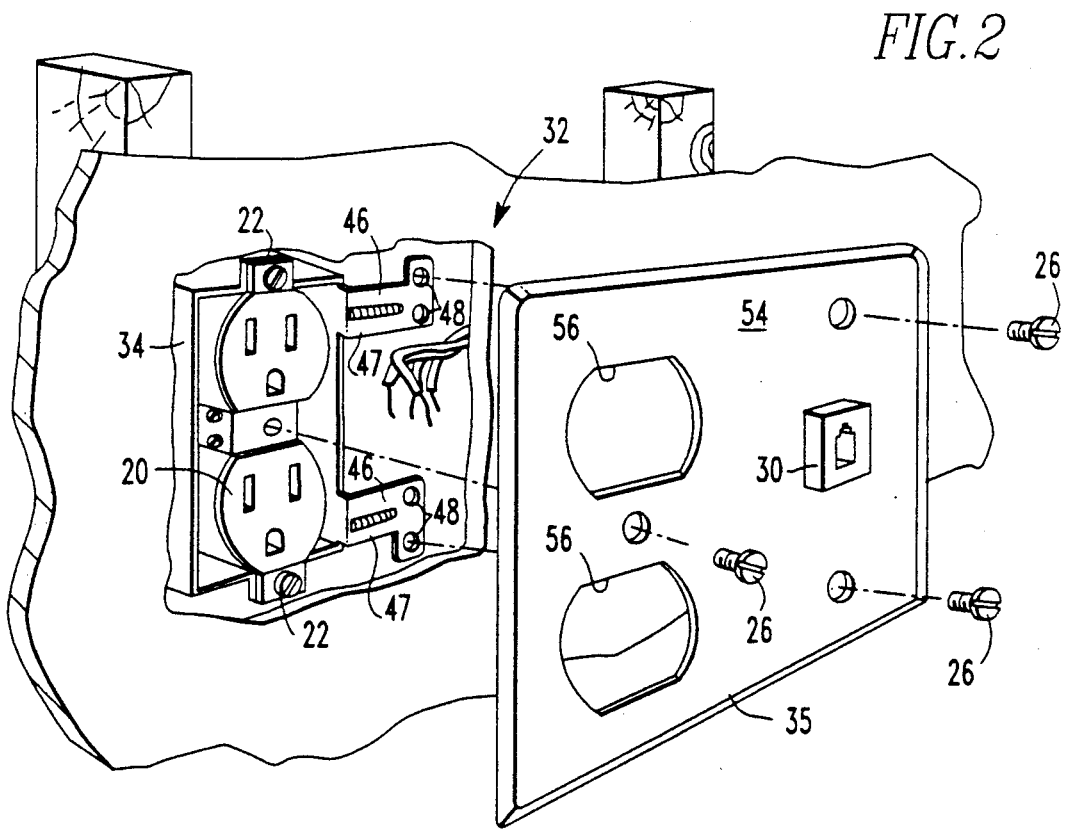
FIG. 2 is a perspective exploded view of a combined power and communication wall terminal according to the present invention.

FIGS. 2 to 5 illustrate a combined power and communication wall terminal according to the invention. The wall terminal, comprehensively identified by the reference numeral 32 comprises a metallic electrical junction box 34 which is used to support a combination wall plate 35 incorporating a communication receptacle 30 and apertures for mating with a dual power receptacle. The structure of the junction box 34 will be described in detail with reference to FIG. 6. The box 34 is made of sheet metal by stamping and comprises a wall structure including an upper wall 36, a lower wall 38, a bottom wall 40 and side walls 42 and 44 respectively. This wall structure defines a generally rectangular housing 45 which is adapted to receive a dual power receptacle 20, of the type shown in FIGS. 1 and 2, a line switch or any other suitable electric power device designed to be installed into a junction box. The receptacle 20 is secured in the housing 45 by means of screws 22. The novel feature of the electrical junction box 34 resides in the provision of a pair of vertically spaced apart support flanges 46 which are generally at a right angle to the side wall 44 and lie in the plane of the opening of the housing 45 which coincides with the plane of the wall-board 16 when the junction box 34 is mounted to a stud member as shown in FIG. 2. The flanges 46 which constitute a mounting and support system for the portion of the combination plate 35 that carries the communication receptacle 30, are vertically spaced apart from one another by a distance so as to accomodate wall plates with single or double communication receptacles. Each support flange is provided with a pair of tapped openings 48 to receive wall plate mounting screws 26 located above and below the communication receptacle 30. A pair of tapped openings is provided in each flange to accomodate wall plates having different mounting screw hole schemes. In addition, the support flanges are provided with longitudinally extending reinforcing ribs 47.

Figure 6:
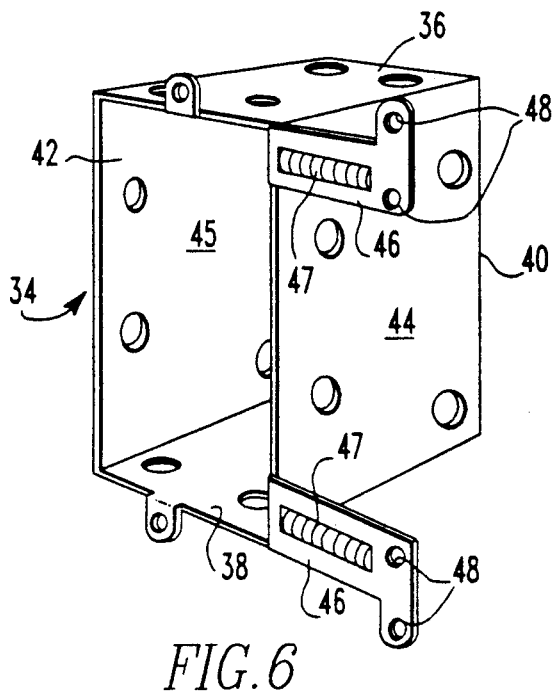
FIG. 6 is a perspective view of the electrical junction box of the combination wall terminal illustrated in FIGS. 2 to 5.

In the embodiment illustrated in FIG. 6, the electrical junction box 34 is made from metal as a one-piece component. It may also be envisaged to make the electrical junction box from a non-metal material such as plastic.

Figure 7:
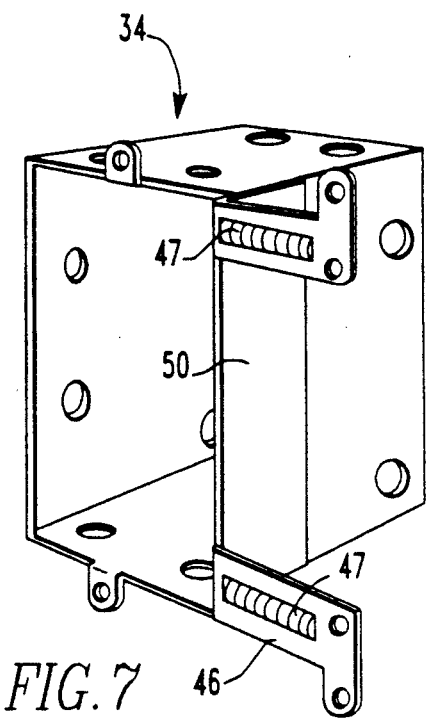
FIG. 7 is a perspective view of the electrical junction box according to a variant.

FIG. 7 illustrates a variant of the electrical junction box 34. In this embodiment, the support flanges 46 are separately formed and are attached to the side wall of a conventional electrical junction box. More specifically, the support flanges 46 are integrally formed with a connection tab 50 in the form of a flat metallic strip which lies flat against the side wall of the electrical junction box and is consequently at a right angle to the flanges 46. The tab 50 may be secured to the electrical junction box by welding, rivets or screws.

Figure 8:
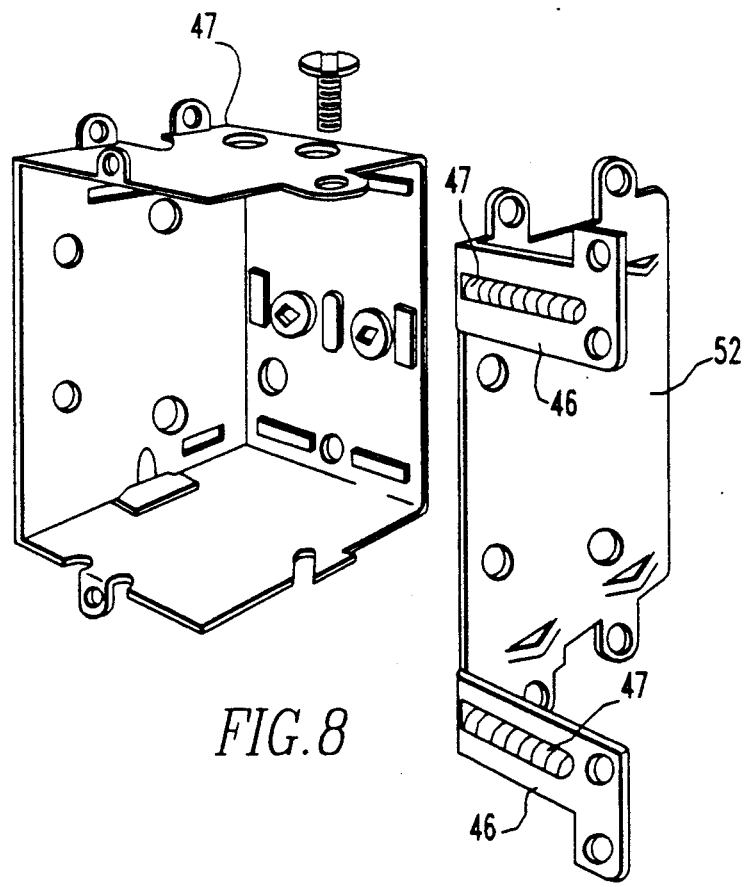
FIG. 8 is a perspective view of a further variant of the electrical junction box.

FIG. 8 illustrates another embodiment of the electrical junction box which is more specifically adapted to be used with conventional knockdown electrical junction boxes that are commonly referred to as "gangable". These boxes have removable side walls so that they can be grouped together to accomodate a plurality of power receptacles, switches or similar devices. In the embodiment of FIG. 8, a side plate 52 is provided which incorporates the support flanges 46. A unitary metallic construction is preferred however, the flanges may be separately provided on the rectangular body of the wall 52 adjacent the front edge thereof such as by means of a retaining tab 50 described in connection with the embodiment illustrated in FIG. 7. The side plate 52 is also provided with releasable connectors so that it may be attached to the knockdown electrical junction box 47. The structure of these connectors is not described in detail because they are well known to those skilled in the art.

Referring back to FIGS. 2 to 5, the combination wall plate 35 includes a main rectangular body 54 made integrally of plastic, metal or any other suitable material, that carries the communication receptacle 30 at one lateral extremity while at the other, it is provided with two apertures 56 to accomodate the bosses of the duplex power receptacle 20 mounted in the electrical junction box 34. The plate 35 is secured to the box 34 by means of screws 26. One of these screws passes through a hole provided between the opening 56 and engages the receptacle 20. Two other screws are provided above and below the communication receptacle 30 and engage each a tapped opening 48 in a corresponding support flange 46 of the electrical junction box 34.

It will be appreciated that the invention is not limited to the combination of a power receptacle and a communication receptacle as other power devices which are normally designed to be mounted in an electrical junction box, such as a line switch for example, may be associated with the communication receptacle. It is to be understood that the apertures 56, in the wall plate 35 will be modified to suit the specific power device used. In a similar manner, a variety of communication receptacles may be provided on the plate 35 without departing from the spirit of the invention. Example are: telephone jacks, coaxial cable connectors, computer data line connectors, etc.

The combined power and communication wall terminal 32 is installed in very similar fashion as conventional power or communication wall terminals. The electrical junction box 34 is mounted in a normal manner to a stud member the only difference being that a wider opening is made in the wall-board 16 in order to accomodate the flanges 46 and the communication receptacle 30 to be received therebetween. The power cable in the housing 45 is connected to a dual power receptacle or another power device which is then secured to the junction box 34 by the screws 20. The communication cable in the wall is connected to the communication receptacle 30 and then the wall plate 35 is secured to the box 34 by means of the three mounting screws 26. It will be appreciated that when the installation is completed, the side wall 44 of the electrical junction box 34 which carries the support flanges 46 forms a partition between the power receptacle 20 and the communication receptacle 30 and their respective conductors.

The above description of various preferred embodiments of this invention should not be interpreted in any limiting manner as variations and refinements of these embodiments are possible without departing from the spirit of the invention. The scope of the invention is defined in the annexed claims.

The embodiments of the invention in which an exclusive property or privilege is claimed are defined as follows:

1. A combination power and communication electrical wall terminal for installation into a hollow wall structure of the type including a plurality of spaced apart stud members forming a skeleton frame and supporting a generally planar wall-board, said combination power and communication wall terminal comprising:
   a) an electrical junction box defining a housing opened toward said wall-board;
   b) an electric power device such as a power receptacle, a switch or the like, mounted in said housing;
   c) support flange means mounted to a side wall of said housing and extending laterally therefrom along said wall-board, said support flange means defining an opening; and
   d) a wall plate mounted to said support flange means, said wall plate including a communication receptacle received in said opening and aperture means for engaging said electric power device, said side wall constituting a partition between said communication receptacle and said power device.

2. A combination power and communication electrical wall terminal as defined in claim 1, wherein said support flange means comprises two vertically spaced apart support flanges.

3. A combination power and communication wall terminal as defined in claim 2, wherein each support flange comprises a mounting tab means at a generally right angle thereto for securing the support flange to said side wall.

4. A combination power and communication wall terminal as defined in claim 3, wherein said mounting tab means is releasably mounted to said side wall.

5. A combination power and communication wall terminal as defined in claim 2, wherein said support flanges are releasably retained to said side wall.

6. A combination power and communication wall terminal as defined in claim 2, wherein each support flange comprises a tapped opening for receiving a wall plate mounting screw.

7. A combination power and communication wall terminal as defined in claim 6, wherein each support flange comprises a plurality of tapped openings to accomodate wall plates having different mounting screw hole schemes.

8. A combination power and communication wall terminal as defined in claim 2, wherein each support flange comprises a stiffening rib.

9. A combination power and communication wall terminal as defined in claim 1, wherein said side wall is removable from said housing.

10. A combination power and communication wall terminal as defined in claim 1, wherein said wall plate includes a rectangular and generally planar main body which is integrally made.

11. A combination power and communication wall terminal as defined in claim 1, wherein said electric power device is a dual power receptacle.

12. A side plate for forming the side of a knockdown electrical junction box, said side plate comprising:
   a generally rectangular main body;
   means for releasably retaining said main body to a knockdown electrical junction box to complete a housing for receiving an electrical power device such as a power receptacle, a switch or the like; and
   support flange means for use in mounting a wall plate mounted to said main body and laterally projecting therefrom, said support flange means extending adjacent to a front edge of said main body generally at a right angle to said main body and defining an opening;
   wherein said support flange means includes two vertically spaced apart support flanges.

13. A side plate as defined in claim 12, wherein each support flange comprises a mounting tab means extending at a right angle thereto for retaining the support flange to said main body.

14. A side plate as defined in claim 13, wherein said mounting tab means is releasably mounted to said main body.

15. A side plate as defined in claim 12, wherein said support flanges are integrally formed with said main body.

16. A side plate as defined in claim 12, wherein each support flange comprises a tapped opening for receiving a screw.

17. A side plate as defined in claim 16, wherein each support flange comprises a plurality of tapped openings to accomodate wall plates having different mounting screw hole schemes.

18. A side plate as defined in claim 12, wherein each support flange comprises a stiffening rib.

19. An electrical outlet junction box for installation into a hollow wall structure of the type including a plurality of spaced apart stud members forming a skeleton frame supporting a generally planar wall-board, said electrical junction box comprising:
   a plurality of wall portions defining a housing opened toward the wall-board for receiving and electrical device such as a power receptacle, a switch or the like; and
   a support flange means for mounting a wall plate mounted to a side wall of said housing and extending laterally therefrom along the wall-board, said support flange means defining an opening;
   wherein said support flange means comprises a pair of vertically spaced apart support flanges.

20. An electrical junction box as defined in claim 19, wherein said support flanges are releasably mounted to said side wall.

21. An electrical junction box as defined in claim 19, wherein each support flange comprises a pair of tapped openings to accomodate wall plates having different mounting screw holes schemes.

22. An electrical junction box as defined in claim 19, wherein each support flange includes a stiffening rib.

23. An electrical junction box for installation into a hollow wall structure of the type including a plurality of spaced apart stud members forming a skeleton frame supporting a generally planar wall-board, said electrical junction box comprising:
   a plurality of wall portions defining a housing opened toward the wall-board for receiving and electrical device such as a power receptacle, a switch or the like; and
   a support flange means for mounting a wall plate mounted to a side wall of said housing and extending laterally therefrom along the wall-board, said support flange means defining an opening;
   wherein said support flange means comprises a tapped opening for receiving a screw.

24. In combination:
   a) an electrical junction box for installation into a hollow wall structure of the type including a plurality of spaced apart stud members forming a skeleton frame supporting a generally planar wall-board, said electrical junction box including a housing opened toward the wall-board for receiving an electrical power device such as a power receptacle, a switch or the like, and a supporting flange means mounted to a side wall of said housing and extending laterally therefrom along the wallboard, said supporting flange means defining a seat; and
   b) a wall plate mounted to said electrical junction box, said wall plate including a generally planar integrally formed main body retained to said supporting flange means, an aperture on said main body facing said housing for engaging an electrical power device to be mounted therein, and a communication receptacle received in said seat, said side wall constituting a partition between said communication receptacle and an electric power device to be mounted in said housing.

25. A combination as defined in claim 24, wherein said supporting flange means comprises two vertically spaced apart support flanges.

26. A combination as defined in claim 25, wherein each support flange comprises a mounting tab means at a generally right angle thereto for securing the support flange to said side wall.

27. A combination as defined in claim 25, wherein said support flanges are releasably retained to said housing.

28. A combination as defined in claim 25, wherein each support flange comprises a stiffening rib.

29. A combination as defined in claim 24, wherein said supporting flange means comprises a tapped opening for receiving a wall plate mounting screw.

* * * * *